May 21, 1940.  E. GADOUX ET AL  2,201,893
ENGINE AND PROPELLER
Filed Jan. 12, 1938    4 Sheets-Sheet 2
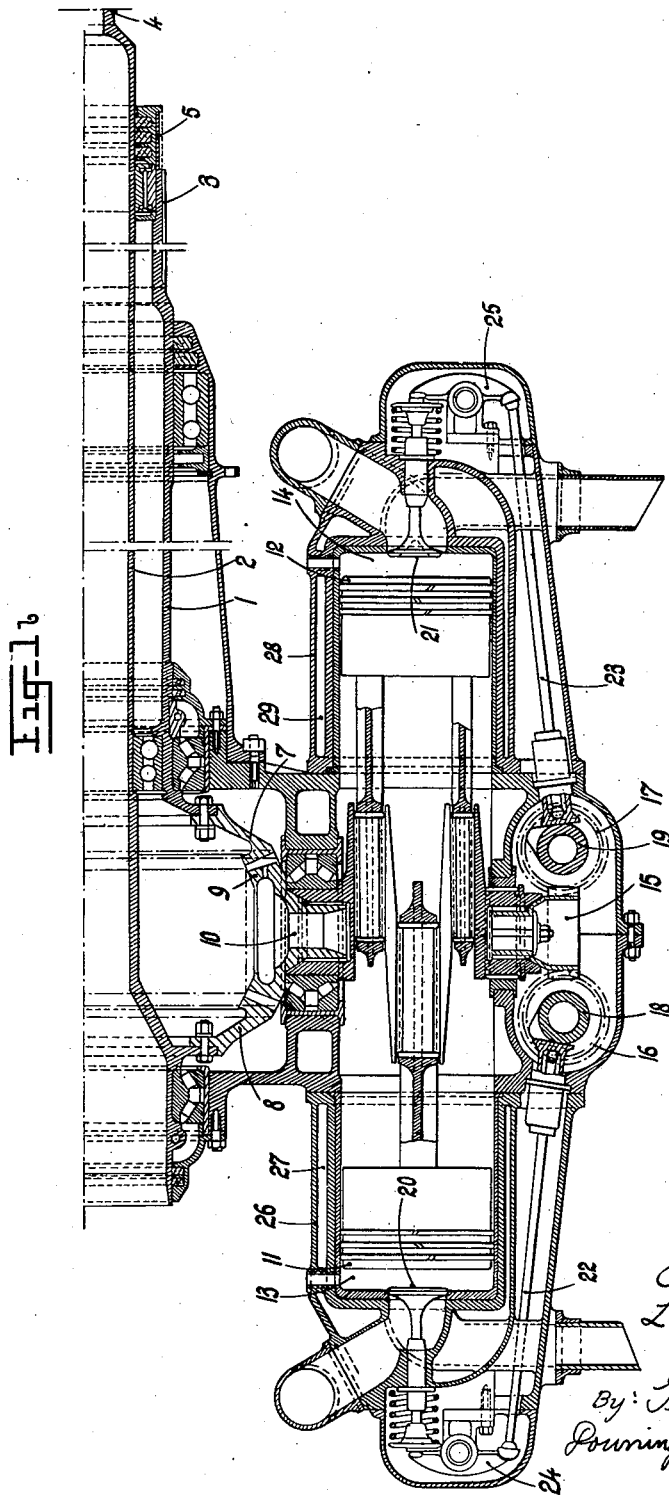

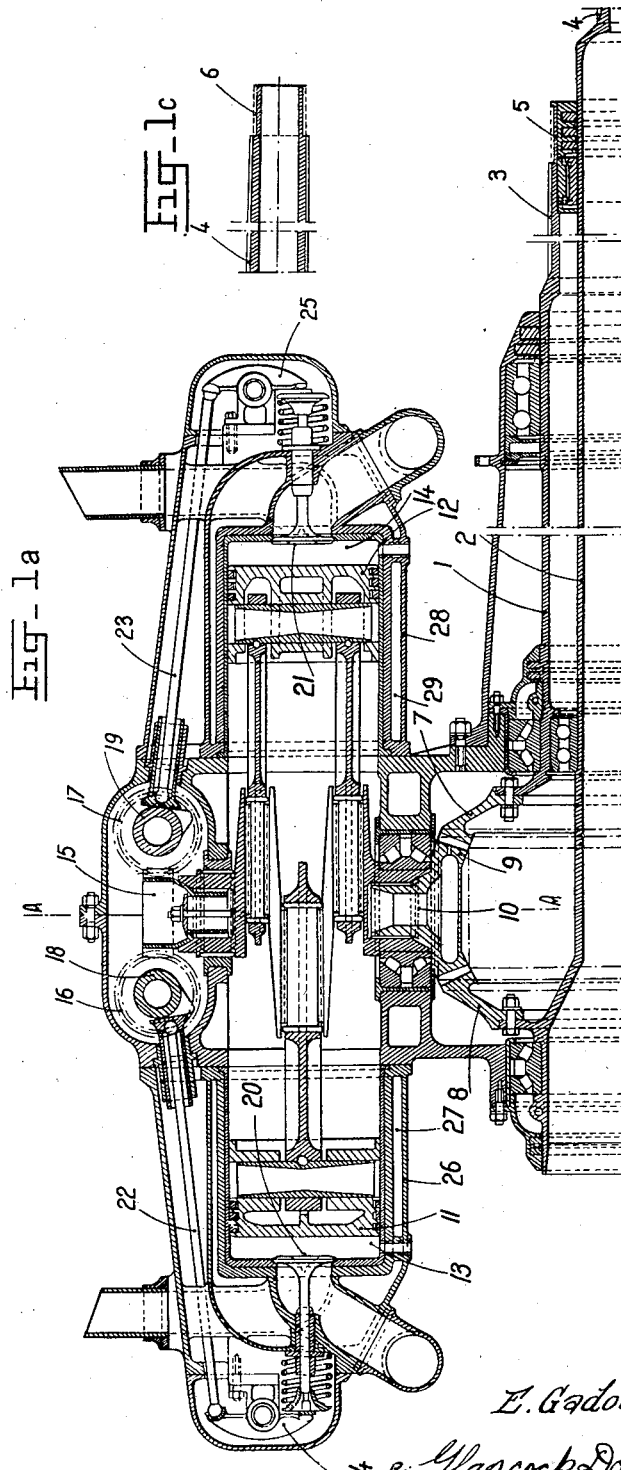

May 21, 1940.　　　E. GADOUX ET AL　　　2,201,893
ENGINE AND PROPELLER
Filed Jan. 12, 1938　　　4 Sheets-Sheet 3
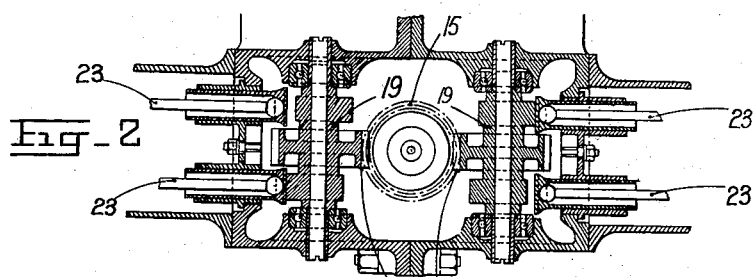
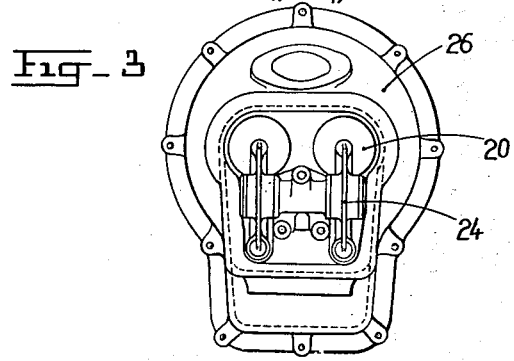
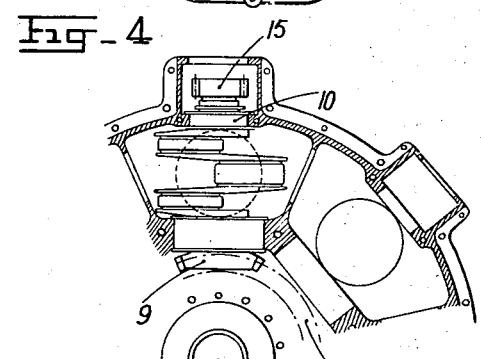
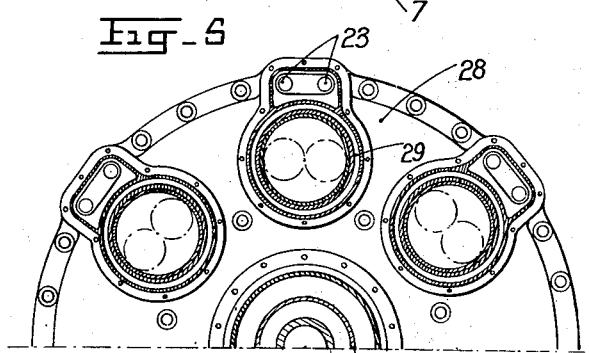
E. Gadoux
L. Crousse
INVENTORS
Attorneys:
By Glascock Downing & Seebold May 21, 1940.  E. GADOUX ET AL  2,201,893
ENGINE AND PROPELLER
Filed Jan. 12, 1938    4 Sheets-Sheet 4
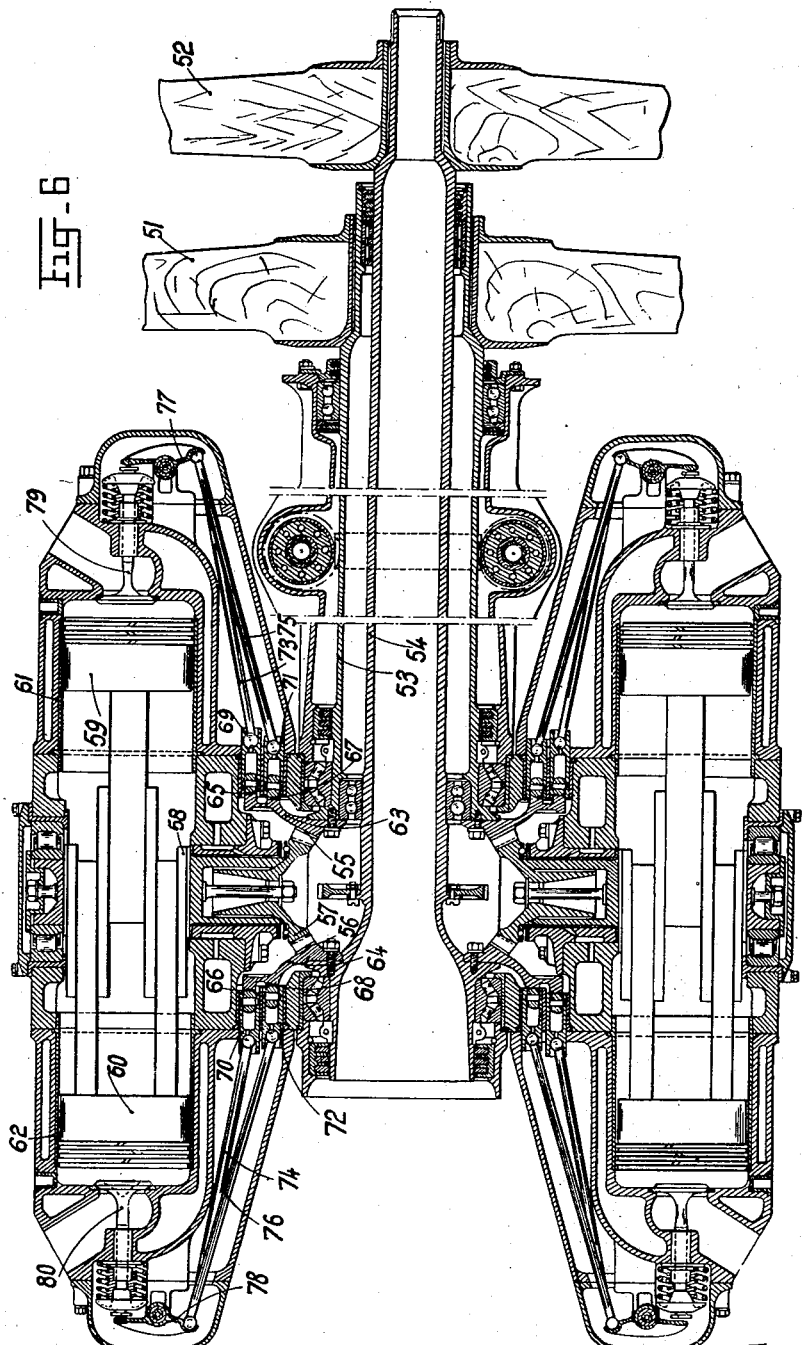
Inventors,
E. Gadoux & L. Crousse
By Glascock Downing & Seebold
Attys.

Patented May 21, 1940

2,201,893

UNITED STATES PATENT OFFICE 2,201,893

ENGINE AND PROPELLER

Eugène Gadoux, La Frette, and Louis Crousse, Paris, France

Application January 12, 1938, Serial No. 184,682
In France January 12, 1937

1 Claim. (Cl. 170—135.5)

It has already been proposed to provide aircraft with firearms adapted to aim through the boss of the propelling air screw. In these proposed arrangements the axis of the barrel of the firearm, whilst passing through the hub of the propeller, does not coincide with the axis of the engine as formed by the crankshaft, so that the concentration of the masses of the parts, and of the reaction forces which are brought into play in firing, at the centre of gravity of the aircraft, which is a condition particularly to be desired, is not realised.

The present invention has for its principal object the avoidance of this disadvantage. The researches after this desirable result led at first to the combination of a speed reduction gear with two shafts rotating in opposite senses; they have also led us to adopt the idea of distribution of the motive couple so as to apply it at several points. Such arrangements are realised in the engine which is the object of this invention, wherein all the elements are disposed so as to have a total symmetry about an axis, on which the crank shaft is not situated, but which remains free of any parts and may be the axis of the barrel of the firearm.

The engine which is the object of the present invention is characterised essentially by the arrangement about a main axis of a number of separate motor elements having radially directed shafts, and by the driving of each propelling air screw by means of a hollow shaft carrying a toothed crown, the axis of which shaft coincides with a main axis of the engine and which is driven by conical gears carried by the radial shafts of the various motor elements. Besides the advantage of achieving an axial mounting of the gun the arrangement according to the invention offers also the advantage of distributing the total motive couple over a number of points of application on the main toothed shaft. This is an improvement in the transmission of the motive power and this mode of transmission is more reliable than the usual one of gear wheels working on a single tooth. Moreover, the diameters of the pinions and of the main toothed shaft may be chosen in such a way that they form a convenient reduction gear.

Such an engine may be associated with two propellers mounted coaxially and rotating in opposite directions, since it is possible to provide at each side of the radial axes of the different motor elements, a toothed crown engaged by the said driving pinions, in such a manner that these toothed crowns can turn in opposite directions and thus drive the two propellers by means of their coaxial hollow shafts. This arrangement offers the advantage of a still more favourable distribution of the engine couple, since it is transmitted by the intermediary of two toothed rims, and moreover it achieves without the employment of any special parts, the avoidance of the reaction couple which is brought into being when the propulsion of the craft is effected by means of only one propeller.

Each of the motor elements which have their shaft disposed radially with respect to the main axis, may conveniently take the form for example of two opposing cylinders with pistons driving the crank shaft which unites them; the said crank shaft carries towards its inner extremity a driving pinion engaging with the main toothed shaft or shafts, and at its outer extremity the crank shaft may carry a pinion with helicoidal teeth which are in engagement with two analogous gears mounted on the cam shafts, which control the valves of the two cylinders by means of rockers. The helicoidal teeth of the pinion mounted at the end of the crank shaft may be inclined at 30° and the helical teeth of the gears on the cam shaft may be inclined at 60° in such a way as to realise a reduction in the ratio 1:2 whilst employing gear wheels of the same diameter; this arrangement allows of reducing the space required.

The cylinders of the various motor elements may be arranged round the main shaft like the chambers of a revolver and the cylinder heads of the two groups of cylinders which are in symmetrical arrangement in accordance with the setting out of the radial shafts form two groups of annular spaces which are cooled by the circulation of water or air.

Instead of carrying two opposing cylinders, each motor element may be constituted in any other known way, for example a number of cylinders in alignment.

In a modified construction, and in order to reduce the size in the direction perpendicular to the axis, the timing control is no longer effected separately for the different engine units by parts located at the outer ends of the crankshafts, but by annular cams secured to the main toothed rings which are mounted on the rotatable propeller shafts; when rotating about the main axis, the said cams cause the axial displacement of push-pieces which act—through rods—upon the rocker arms controlling the valves. In this manner all of the parts controlling the rocker arms can be located between the cylinders and the main axis of the engine without increasing the size of this engine in the direction perpendicular to its axis. The admission valves of all the front cylinders can be controlled by the same cam which is mounted on the outer propeller shaft; a second cam which is mounted on the same shaft, controls the exhaust valves of the same cylinders. In like manner, the valves of the rear cylinders can be controlled by two cams mounted on the inner propeller shaft.

It will thus be observed that by using for the toothed ring a number of teeth which is double the number of teeth of the driving pinions, the aforesaid construction will provide for the following features, by the use of the same gearing.

1. The reduction of speed between the driving shafts and the propeller shafts which rotate at half the speed of the driving shafts.

2. The reversal of the direction of rotation for the two propellers, as the two toothed rings driving their shafts are driven in contrary directions by the actuating pinions, since the said rings are located on the respective sides of the axial planes of the said pinions.

3. The timing, as the toothed rings are provided with cams which rotate at half the speed of the driving shafts, and provide for the control of the valves according to the four-stroke cycle.

The accompanying drawings show by way of example two constructional forms of engine with axial cannon, the subject-matter of the invention.

The accompanying drawings show by way of example a mode of construction of the engine provided with an axial gun in accordance with this invention.

Figures 1a and 1b are two halves of an axial section of the engine, Fig. 1c being the axial section of the end part of said engine.

Fig. 2 is a section through the axes of the cam shafts of a motor element.

Fig. 3 is a view from the end of a cylinder.

Fig. 4 is a section along the line AA of Fig. 1.

Fig. 5 is a transverse section showing the jacket for cooling the cylinders.

Fig. 6 is an axial section of a modified form of construction.

The engine represented in Figs. 1a, 1b and 1c is arranged to drive two propellers in opposite senses by means of two hollow shafts 1 and 2 which are coaxial one within the other and of which the common axis constitutes the main axis of the engine; the two propellers which are not shown in the drawings are mounted at the extremities of these two hollow shafts respectively at 3 and 4 and are kept in position by nuts which engage the threads 5 and 6. Shafts 1 and 2 carry respectively toothed crowns 7 and 8 which are in engagement with the driving pinions 9 provided at the ends of the radial shafts 10 of the various motor elements distributed about the main axis.

In the example shown each crank shaft 10 is driven by pistons 11 and 12 of two opposing cylinders 13 and 14, and the arrangement is such that the various cylinders 13 and 14 are disposed in the manner of revolver chambers horizontally about the main axis of the engine. At its extremity opposite to the pinion 9 the shaft 10 carries a pinion 15 with helicoidal teeth in engagement with two gears 16 and 17 which are carried by the respective cam shafts 18 and 19 which control the valves 20 and 21 of the cylinders 13 and 14 through rods 22 and 23 and rockers 24 and 25. In this way the cam shaft 18 controls the two valves 20 of the cylinder 13 and the cam shaft 19 controls the two valves 21 of the cylinder 14.

The heads of the cylinders 13 form a closed crown in a single piece 26 which furnishes for each cylinder a water jacket 27; in the same way the heads of the cylinders 14 form a crown 28 with water jackets 29.

The barrel of the gun may be arranged in the interior of the hollow shaft 2 along the axis of the engine and it will then aim through the hubs of the two air screws mounted at 3 and 4.

The number of elements distributed about the main shaft may be any desired number; in the example shown in the drawings there is an arrangement of seven motor elements each composed of two opposing cylinders; in this case the total motive effort transmitted by the pinions 9 will be distributed over the two toothed crowns 7 and 8 at fourteen different points.

The engine represented in Fig. 6 is constructed for the driving, in contrary directions, of two propellers 51 and 52 by two respective hollow shafts 53 and 54, one inside the other, whose common axis constitutes the main axis of the engine. The said shafts carry two respective toothed rings 55 and 56 engaging pinions 57 mounted on the ends of the radial shafts 58 of the various engine units which surround the main shaft.

In the embodiment herein represented, each crankshaft 58 is actuated by the pistons 59 and 60 of two oppositely-situated cylinders 61 and 62, and in this construction the various cylinders 61—62 are mounted in a circular row around the main shaft of the engine. The toothed rings 55 and 56 are provided with appendages 63 and 64, each of which comprises two annular roller races 65—67 and 66—68 cooperating with rollers mounted on the push-pieces 69—71 and 70—72, respectively. The push-pieces 69—70 actuate—through rod-and-link gear 73—74—the rocking levers of the admission valves; the push-pieces 71—72 actuate through the rods 75—76—the rocking levers 77 and 78 of the exhaust valves 79 and 80, respectively.

The cannon may be mounted in the interior of the hollow shaft 54, on the axis of the engine, and it will thus fire through the hubs of the two propellers 51 and 52.

Any suitable number of engine units surrounding the main shaft can be employed, and the ignition will take place successively for the front cylinders 61 in the direction of rotation of the outer propeller shaft 53 which operates the cams 65—67 for the control of the timing; for the rear cylinders 62, the ignition will take place successively according to the contrary rotation of the inner propeller shaft 54 which operates the corresponding cams 66—68. It is obvious that a complete revolution of the shafts 53 and 54 should correspond to an even number of revolutions of the crankshafts, in order that the cams may provide for the timing according to the four-stroke cycle. In practice, the gearing 55—56—57 will have such construction that the shafts 53 and 54 will rotate in the contrary direction at half the speed of the crankshafts 58, and thus a complete revolution of the cams will correspond to an entire operating cycle of the cylinders 61 and 62, and in this event each cam will comprise a single boss which covers about 90° and controls the opening of the corresponding valves.

We claim:

An engine comprising two co-axial propeller shafts rotatable in opposite directions, front and rear propellers on said shafts, a toothed crown carried by each of the propeller shafts, motor units including groups of front and rear cylinders parallel to the propeller shafts, and motor shafts arranged radially about said propeller shafts, a bevel gear wheel carried by each of said motor shafts and meshing with said toothed crowns, said cylinders including valves, a cam for operating the valves of the front group of cylinders secured to the toothed crown of the rear propeller shaft, and a cam for operating the valves of the rear group of cylinders carried by the toothed crown on the front propeller shaft.

LOUIS CROUSSE.
EUGÈNE GADOUX.